United States Patent
Smith

(10) Patent No.: US 9,992,885 B1
(45) Date of Patent: Jun. 5, 2018

(54) RETENTION SYSTEM

(71) Applicant: Mark Smith, Palo Alto, CA (US)

(72) Inventor: Mark Smith, Palo Alto, CA (US)

( * ) Notice: Subject to any disclaimer, the term of this patent is extended or adjusted under 35 U.S.C. 154(b) by 184 days.

(21) Appl. No.: 14/645,377

(22) Filed: Mar. 11, 2015

(51) Int. Cl.
| | | |
|---|---|---|
| *H05K 5/02* | (2006.01) | |
| *F16M 11/04* | (2006.01) | |
| *F16M 11/22* | (2006.01) | |
| *F16M 13/02* | (2006.01) | |
| *F16B 2/06* | (2006.01) | |
| *B60R 11/02* | (2006.01) | |

(52) U.S. Cl.
CPC ........ *H05K 5/0204* (2013.01); *B60R 11/0241* (2013.01); *F16B 2/065* (2013.01); *F16M 11/04* (2013.01); *F16M 11/22* (2013.01); *F16M 13/02* (2013.01)

(58) Field of Classification Search
CPC ........ B60R 11/0247; F16B 2/065; F16B 2/10; F16M 11/04; H04B 1/3877
See application file for complete search history.

(56) References Cited

U.S. PATENT DOCUMENTS

| | | | | |
|---|---|---|---|---|
| 5,863,033 A | * | 1/1999 | Bradford | B25B 5/06 269/3 |
| 6,220,589 B1 | * | 4/2001 | Smith | B25B 5/003 269/133 |
| 7,551,458 B2 | * | 6/2009 | Carnevali | B60R 11/0252 174/520 |
| D646,137 S | * | 10/2011 | Krohmer | D8/73 |
| 9,080,714 B2 | * | 7/2015 | Minn | B60R 11/0241 |
| 9,117,351 B2 | * | 8/2015 | Gulick, Jr. | G08B 13/149 |
| 9,160,273 B2 | * | 10/2015 | Schuit | F16B 2/065 |
| 9,568,148 B2 | * | 2/2017 | Carnevali | B60R 11/0241 |
| 9,581,291 B2 | * | 2/2017 | Trotsky | F16M 11/041 |
| 2011/0019992 A1 | * | 1/2011 | Orf | F16M 11/041 396/419 |
| 2013/0170823 A1 | * | 7/2013 | McDonald | G03B 17/565 396/428 |
| 2015/0201113 A1 | * | 7/2015 | Wood | G03B 17/561 348/376 |

* cited by examiner

*Primary Examiner* — Joshua T Kennedy

(74) *Attorney, Agent, or Firm* — John C. Merchant

(57) ABSTRACT

A screen retention system for mounting of smartphones, tablet computers and other flat screen displays. A screen display is held against the inner surfaces of the opening of a semi-rigid arc by a post extending from the inner surface of the arc toward the opening. A screen based device may be inserted into the arc and retained within the opening by contact between the pressure plate and the opposing ends, thereby securing the screen based device within the arc by three points of pressure, at least one point of pressure supporting the screen based device against the inside surfaces of the opposing ends.

20 Claims, 24 Drawing Sheets

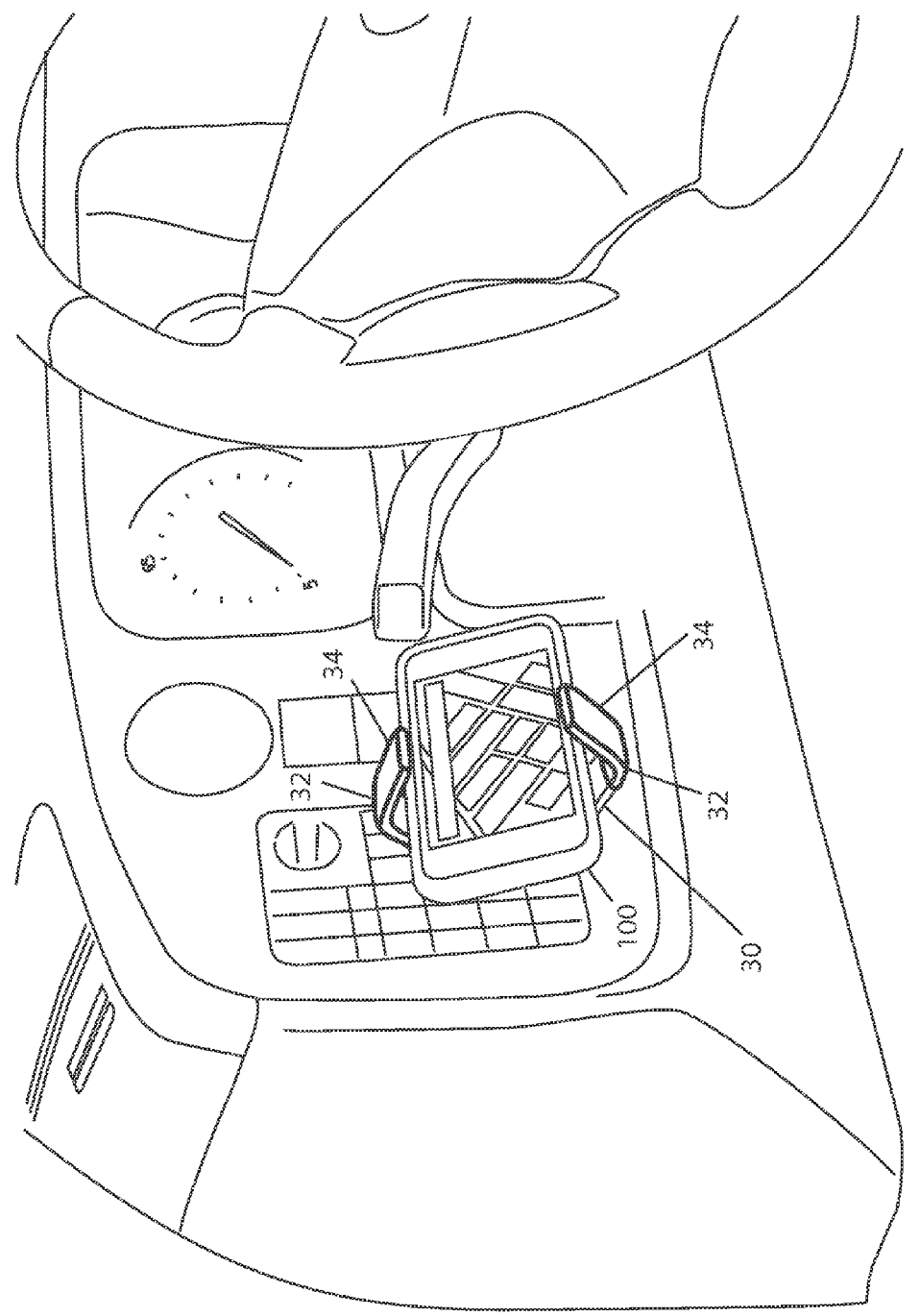

RETENTION SYSTEM

CROSS-REFERENCE TO RELATED APPLICATIONS

This application claims the benefit of provisional patent application Ser. No. 61/950,850 filed 2014 Mar. 11 by the present inventor.

BACKGROUND—PRIOR ART

The following is a tabulation of some prior art that presently appears relevant:

| U.S. Patents | | | |
|---|---|---|---|
| Pat. No. | Kind Code | Issue Date | Patentee |
| 8,328,055 | $B_1$ | 2012 Dec. 11 | Snyder |
| 8,770,539 | $B_1$ | 2014 Jul. 8 | Hsu |

| U.S. patent application Publications | | | |
|---|---|---|---|
| Publication Number | Kind Code | Publ. Date | Applicant |
| 20140165261 | $A_1$ | 2014 Jun. 19 | Morris |
| 20140291469 | $A_1$ | 2014 Dec. 2 | Zito, Stafford |
| 20120080465 | $A_1$ | 2014 Apr. 5 | Son |

| Nonpatent Literature Documents |
|---|
| http://www.velocityclip.com |
| http://photojojo.com/store/awesomeness/anycase-tripod-adapter/ |

The smartphone product market continues to evolve rapidly. Each new device is embedded with the latest advances in electronic hardware, software, power management and lenses.

Most, if not all, of the new devices, are to be used by the operator in a handheld manner. Like a soap bar in the shower the smartphones can slip out of a user's hands. It's commonly accepted today that there are times when handheld operation requires augmentation or times where hands-free operation is preferable.

For instance, today's sequential image capture devices record images and sound via sensors which digitize signals into digital files for subsequent playback on data processing devices. In the case of captured image playback change in the X and Y and Z axes of the capture device during sequential image capture needs to be smooth and fluid to maximize viewer enjoyment. Exceptions to this rule result if the images are captured at a shutter speed faster than $\frac{1}{250}$ of a second and subsequently viewed as still frames. Or optionally, if the recording device has a super wide angle lens attached, what would normally be unacceptable changes in the X and Y and Z axes may be more tolerable by the viewing audience. For recordings captured without a super wide angle lens to be viewed as simulated motion, movement of the captured frame within the X and Y and Z axes ideally must not be subject to changes perceived as non-fluid. Non-fluid changes can be very small, commonly called jitter or shake. Or the non-fluid changes can be large and sudden like when a young child gets a hold of the capture device while it is recording or the capture device operator falls, trips or gets bumped.

It is recognized that any sequential image capture device mounted to a "fluid head" on a rigid three-legged tripod will capture fluid and stable images if operated correctly but suffers from the requirement of being in a stationary position.

The reference standard for stable image capture of sequential images without mounting the camera to a free-standing inanimate object and anchoring it to the earth is the twenty plus pound shoulder mountable video camera. Gimbal, gyroscope and Steadicam® based sequential image capture mounting systems represent the state-of-art for image capture while the capture device and operator are in motion. Gimbal, gyroscope, and Steadicam® based systems require training, can be hard to operate, and while there are lightweight versions, if handheld, they quickly lead to operator fatigue.

The push toward convenience in the sequential image capture market has dictated the removal of weight and size in favor of pocket-friendliness and mobility. Popular capture devices usually fit in a coat pocket. The absence of weight, physical size and mounting fixtures render all prior image capture stabilization methods obsolete. Why carry a miniaturized capture device if you have to add a ten pound stabilization device? An additional side effect of the small size and weight of these new super-mobile image capture devices is their susceptibility to micro-level movements caused by body tremors, motion, and wind. Manufacturers of sequential image capture devices recognize the importance of a stable image and frequently implement electronic systems to remove micro-level image disturbances. The electronic image stabilization systems exist in cameras and lenses where the build cost and energy consumption parameters permit. As mentioned above one affordable and energy efficient alternative utilized on miniature image capture devices the GoPro Hero and Hero2 makes use of an extra wide angle lens to minimize the impact of motion on the X, Y and Z axes during shooting.

Recorded images with deltas in the x and y direction can be stabilized by means of computer-based post-processing of the sequential images via specialized software programs. This operation is time consuming both for the computer operator and the computer itself and requires mastery of the software applications. YouTube® has recently added this functionality as an post-processing option on files uploaded to the YouTube® service. However it should be noted that if the post-processing stabilization option is selected the processing time is increased and the image quality will degrade according to the level of stabilization which gets applied.

Because of how images are captured by the more light sensitive BSI (back-side-illuminated) CMOS sensors in the devices motion in the X and Y axes may produce wavy artifacts known as the "jello" effect. These motion artifacts result when the image capture device is moved faster than the image sensor can read the image.

Some day there may be suitable electronic means for stabilizing images. But given that fluid motion has become a "style" of shooting, stabilizing or providing enhanced control over motion in the X, Y and Z axes remains a top priority for sequential image shooters.

Prior art in the realm of non-electronic image stabilization include the following products/brands: Steadicam, Glidecam, EasyRig, Handgrips, Fluid Tripod Heads and Tripod Legs, Monopods, Manfrotto Fig Rig, Joby GorillaMobile for iPhone4, Owle Bubo, Mobislyder Camera Dolly, as well as a flag pole harness for monopod body mount and adjustable inelastic camera straps and adjustable moderately elastic neoprene Op/Tech camera straps. Also some professional video cameras are long enough to be mounted on a shoulder and held stable by the operator's hand and head via the eye socket pressed into the camera at the padded eyepiece/viewfinder. It should be noted that none of the above prior art is pocket-friendly or wearable.

A retention system which allows smartphones to be handled more securely should mount to monopods, tripods and other devices. The retention system should also enable windshield mount usage, desktop usage and allow the device to be carried in a pocket. Ideally the retention system would allow the smartphone to be used in every activity a user might anticipate.

SUMMARY OF THE INVENTION

This invention concerns itself with creating a secure retention system for smartphones and tablet computers and LCD screens. The invention is to be used with screen based devices. The invention functions similarly to how a bed frame clamp uses a centered screw based piston to create pressure against two opposing wings.

All implementations of the device are also intended to provide a wider range of retention over the traditional solutions.

BRIEF DESCRIPTION OF THE DRAWINGS

FIG. 24 is a side perspective view of the invention in FIG. 7 which shows the invention being used mounted in a car in a horizontal position;

DETAILED DESCRIPTION OF THE INVENTION

Figure 1:
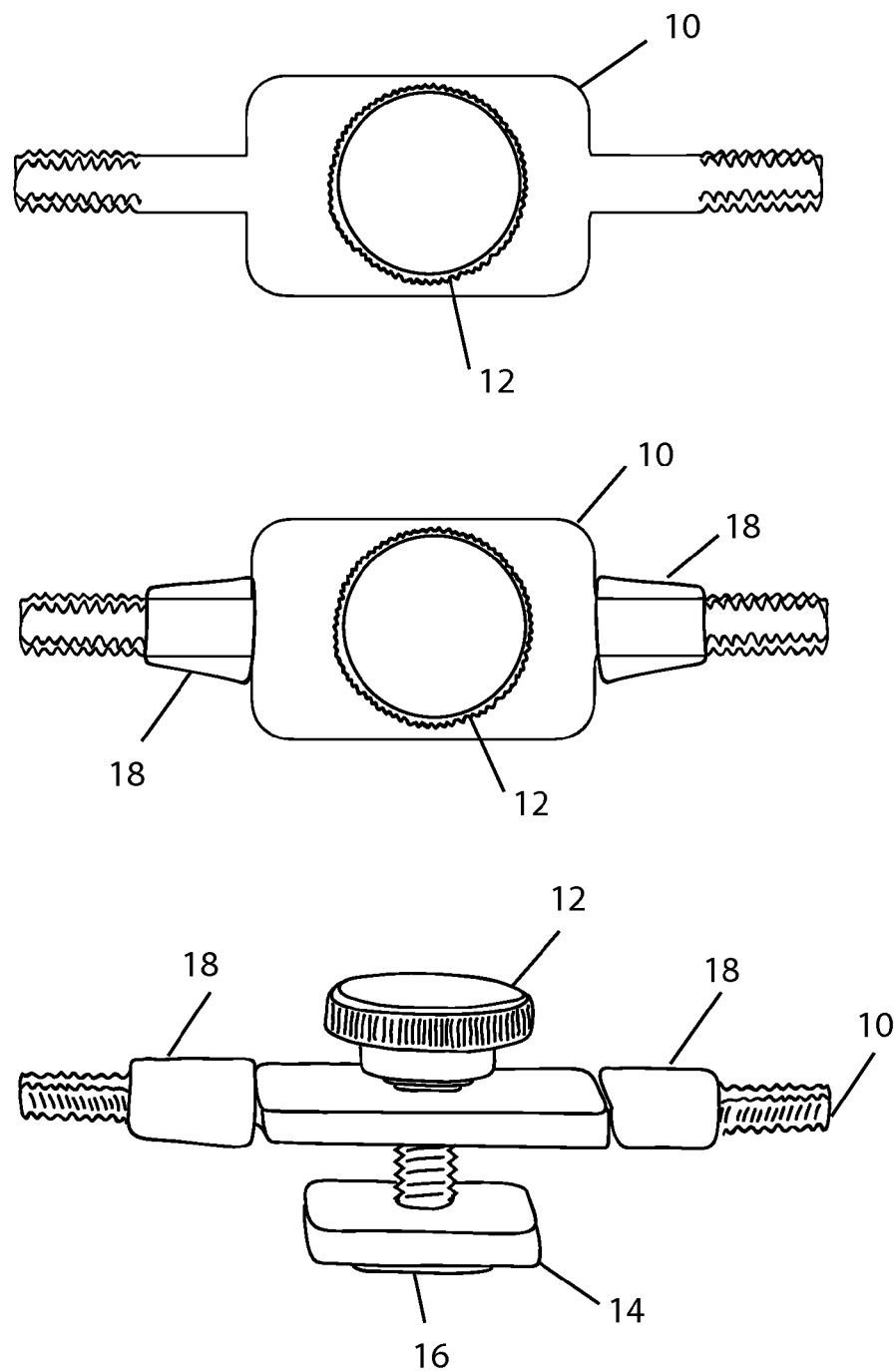
FIG. 1 is a top and perspective side view of dual stemmed threaded bar of the present invention.
Figure 4:
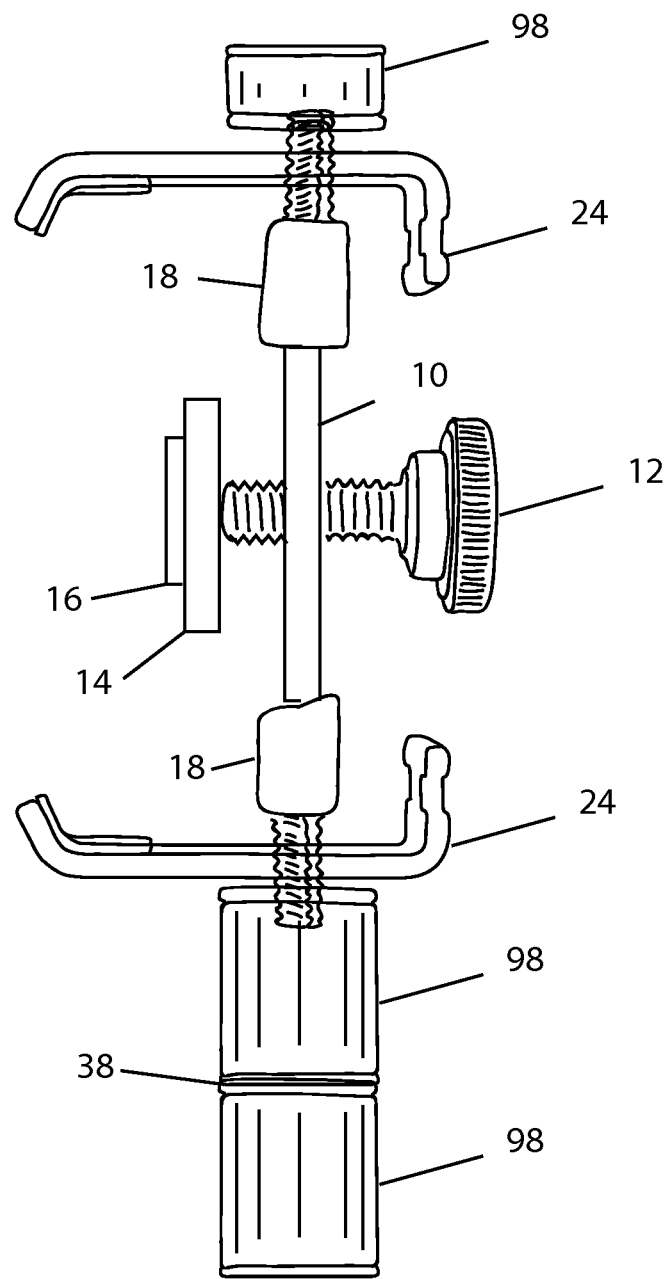
FIG. 4 is a side perspective view of the invention with the locking barrels and without a device.
Figure 5:
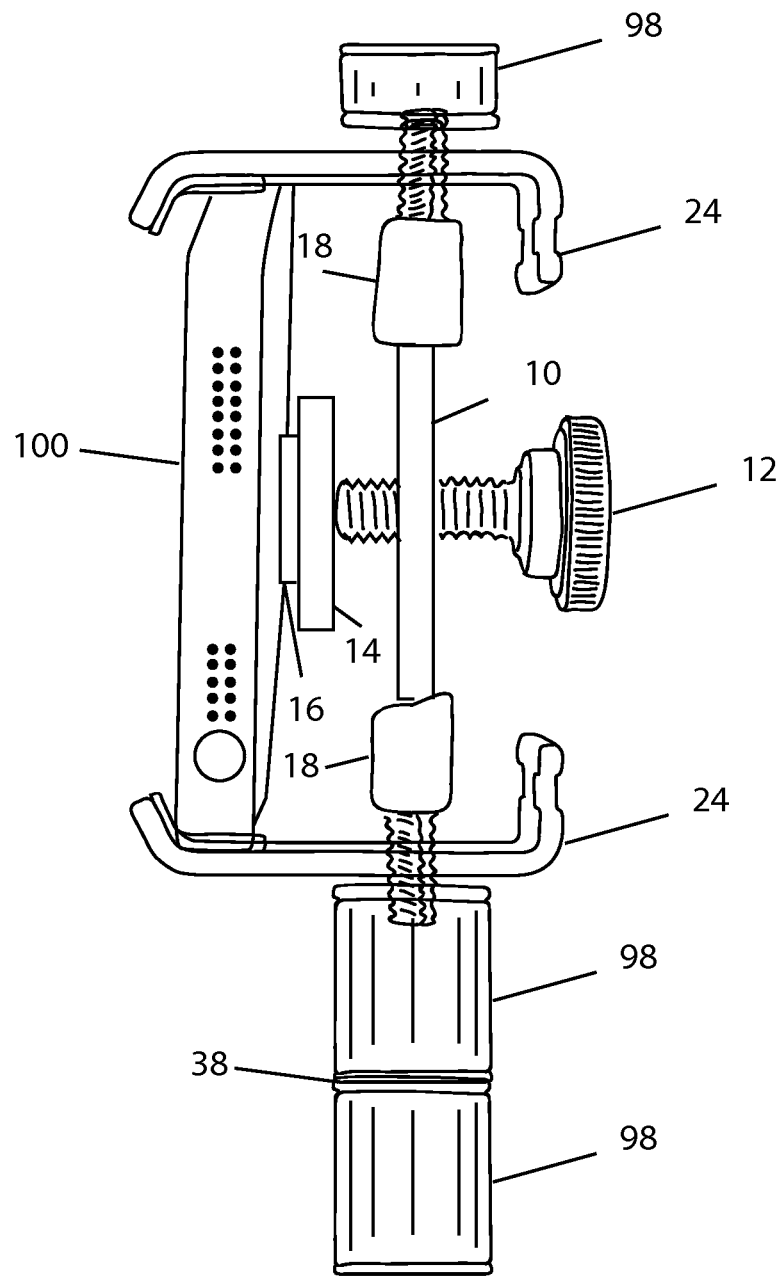
FIG. 5 is a side perspective view of the invention with the locking barrels with a device.
Figure 6:
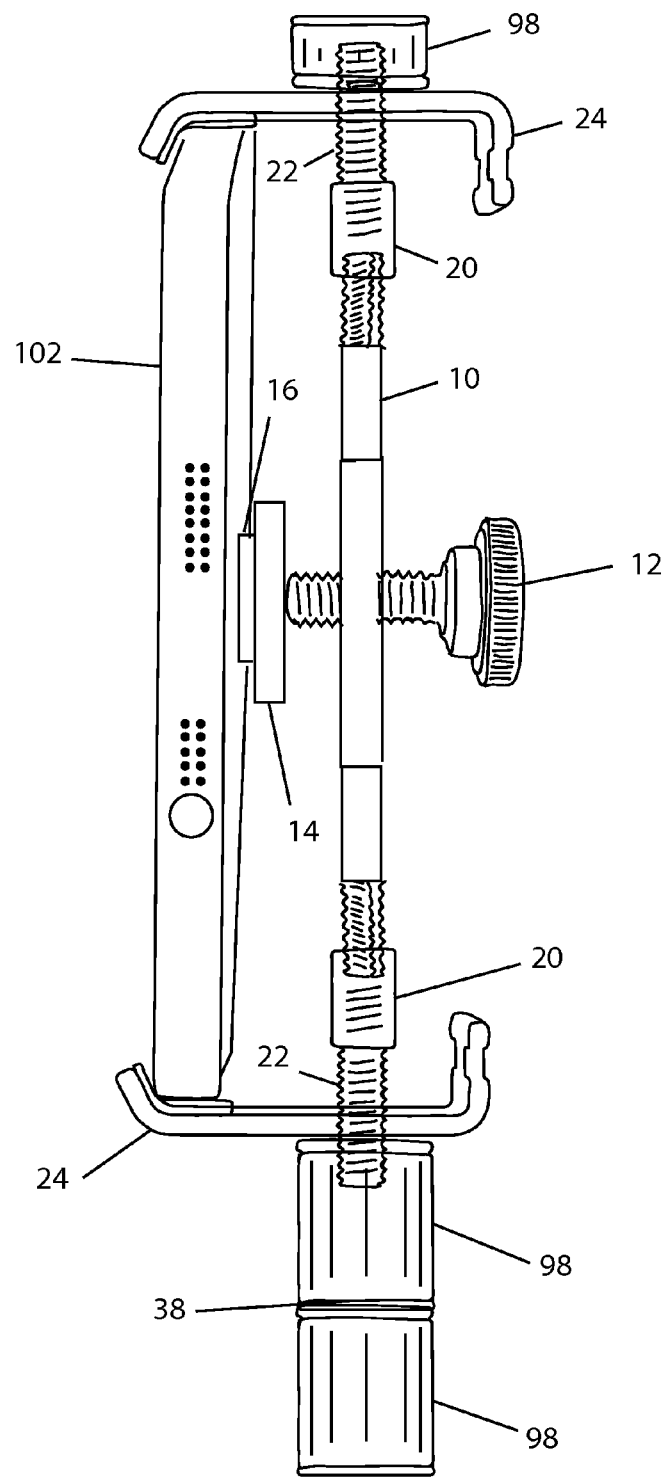
FIG. 6 is a side perspective view of the invention in FIG. 5 with a larger device.

Referring now to the invention in more detail, in FIG. 1 there is shown components of a complete device retention and handle system device seen assembled in FIG. 4, FIG. 5 and FIG. 6. Component m is a threaded bar 12 is a thumb screw 14 is pressure plate 16 is a pad attached on the pressure plate 14. 18 are two rubber covers. Components 12, 14, 16 are attached to the threaded bar via threads which allow for the pressure plate 16 to be finely adjusted.

The assembly details of the invention as shown in FIG. 4, FIG. 5 and FIG. 6 are that the 12 thumb screw would be threaded into m the threaded bar then 14 the pressure plate is threaded on to the end of 12 the thumb screw and glued or welded into place so the tip of the 12 thumb screw is flush with 14 the pressure plate and 16 the pad may be adhered to 14 and cover 12 the tip of the thumb screw so 14 the pressure plate does not mar a media device. and two threaded tab components 24 are screwed on to the threads of the threaded bar 10. The bar, tabs may be made of metal, plastic or of any other sufficiently rigid and strong material. Further, the various components of the device retention and handle system can be made of different materials.

Figure 2:
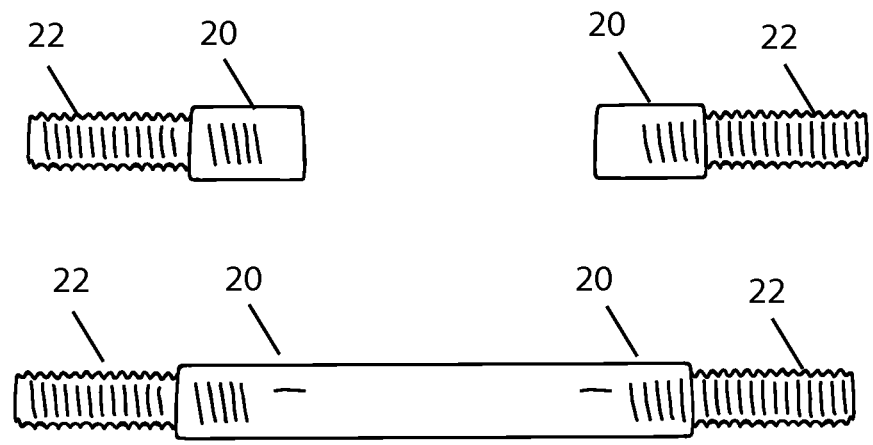
FIG. 2 is a top view of cylindrical extensions of the present invention.
Figure 3:
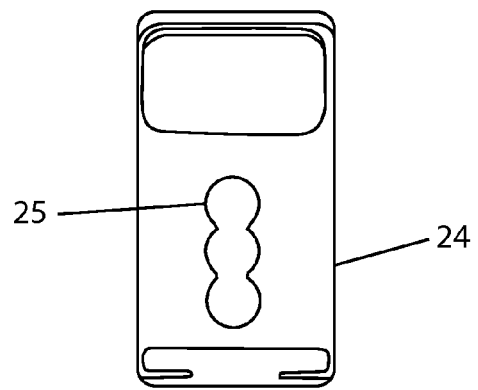
FIG. 3 is a bottom and side view of threaded tabs of the present invention.
Figure 3:
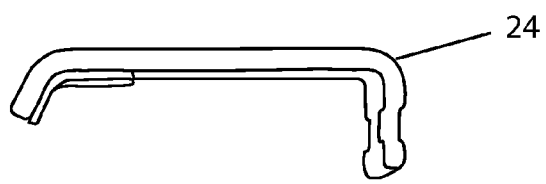
Figure 3:

In further detail, referring to the invention FIG. 2 are threaded components 20 with threaded set screws 22 mounted in 20. FIG. 3 shows top and side views of the threaded tab component 24. The tab components 24 may have a plurality of threaded positions 25 to allow for the varying depth of devices and their battery packs.

The threaded tab components 24 screw on to the top and bottom threaded posts of the threaded bar 10. The tabs are secured by component 98. A plurality of threaded components 98 may be connected to the threaded bar m via set screws 38 to create a handle varying in size from 0.99" through 5.01".

FIG. 5 shows the invention fully assembled with a media device 100 pressed into two tab components 24 by the pressure plate 14 and the pad 16 via the thumbscrew 12.

FIG. 6 shows an embodiment of the device for larger media devices 102 and employs the use of the threaded components 20 and set screws 22 to extend the height of the threaded bar 10.

Figure 7:
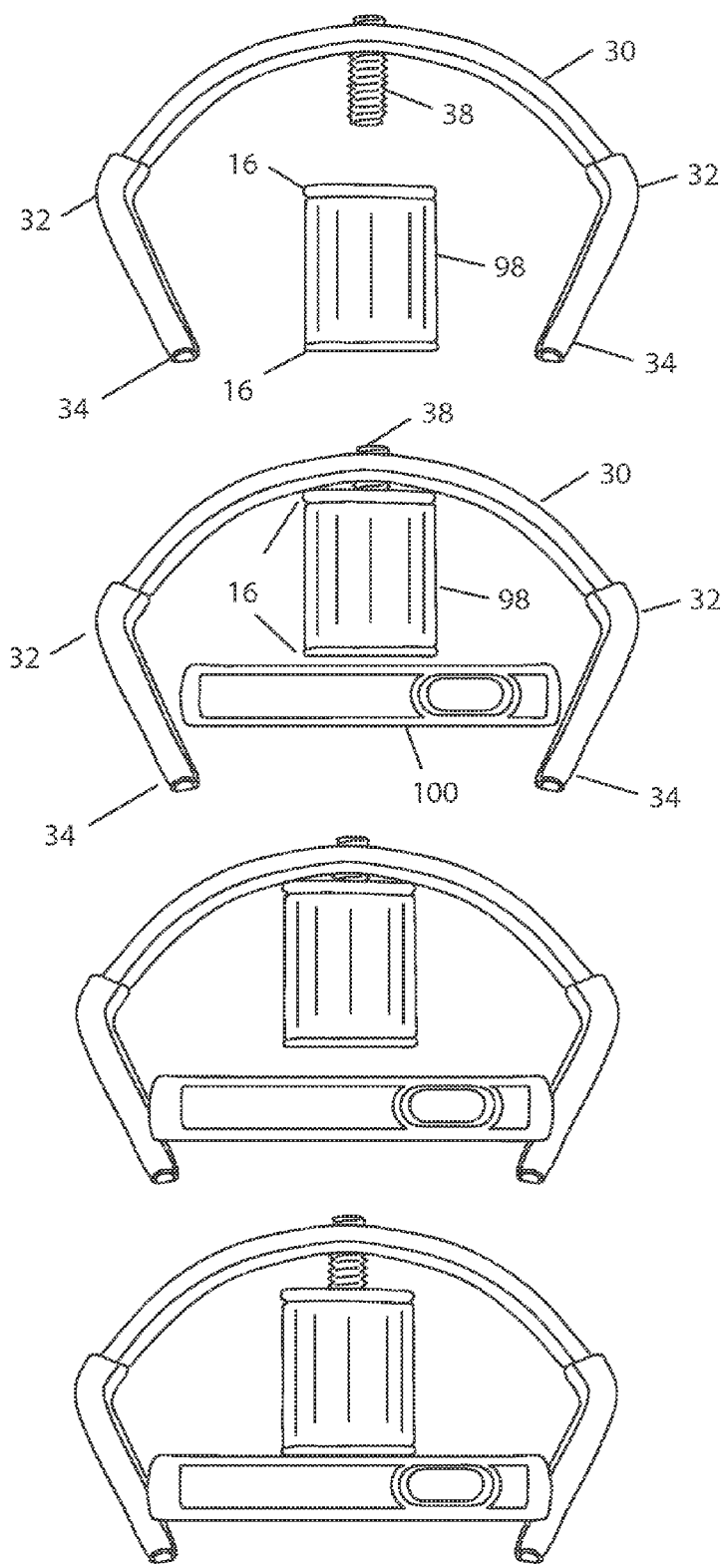
FIG. 7 is a side view of an additional embodiment of invention showing how parts go together.

Referring now to a separate embodiment of the invention, in FIG. 7 there is shown components of a device retention and handle system. Component 30 is an arc made of metal with tabs 32 bent or hinged inward to reduce the opening of the arc 30. The tabs 32 are covered by rubber or padded sheaths 34. The arc in FIG. 7 has a threaded hole 36 drilled into the arc where a set screw 38 of indiscriminate length may be threaded into the threaded hole 36 and where the threaded and slotted component 98 acts as the pressure plate with a pad 16. FIG. 7 is a sequence and shows how a media device slides into the arc 30 between the sheathed tabs 32, 34 and is pushed into the retention position by rotating the threaded component 98 with pad 16 along the set screw 38 until the media device is pressed securely into the tabs thereby creating three points of contact with the media device from the pressure from threaded component 98 and the pad 16.

Figure 8:
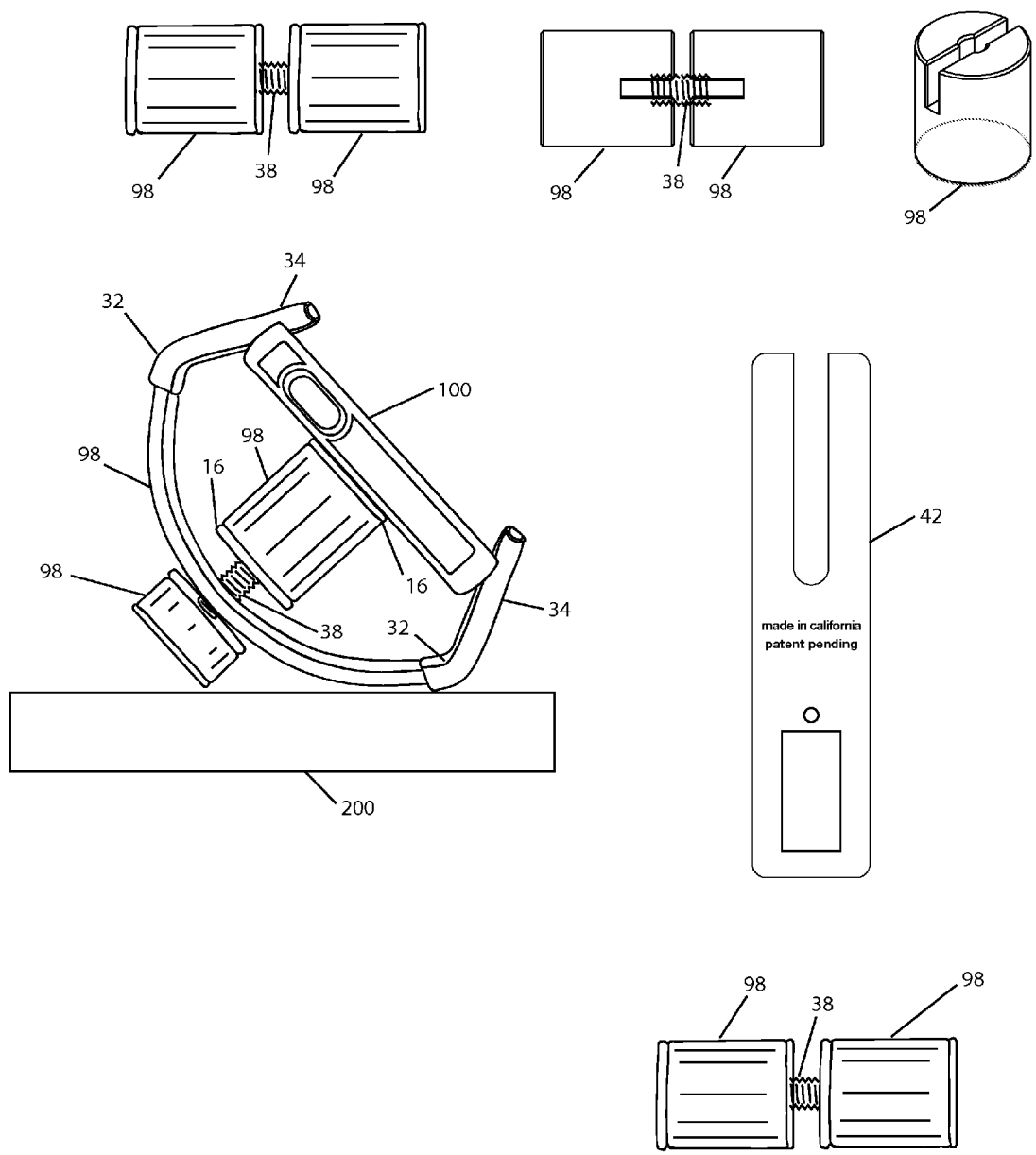
FIG. 8 is a side, top and perspective view of the invention in FIG. 7 with a nut for mounting on a slotted bar and a nut for rotation.
Figure 9:
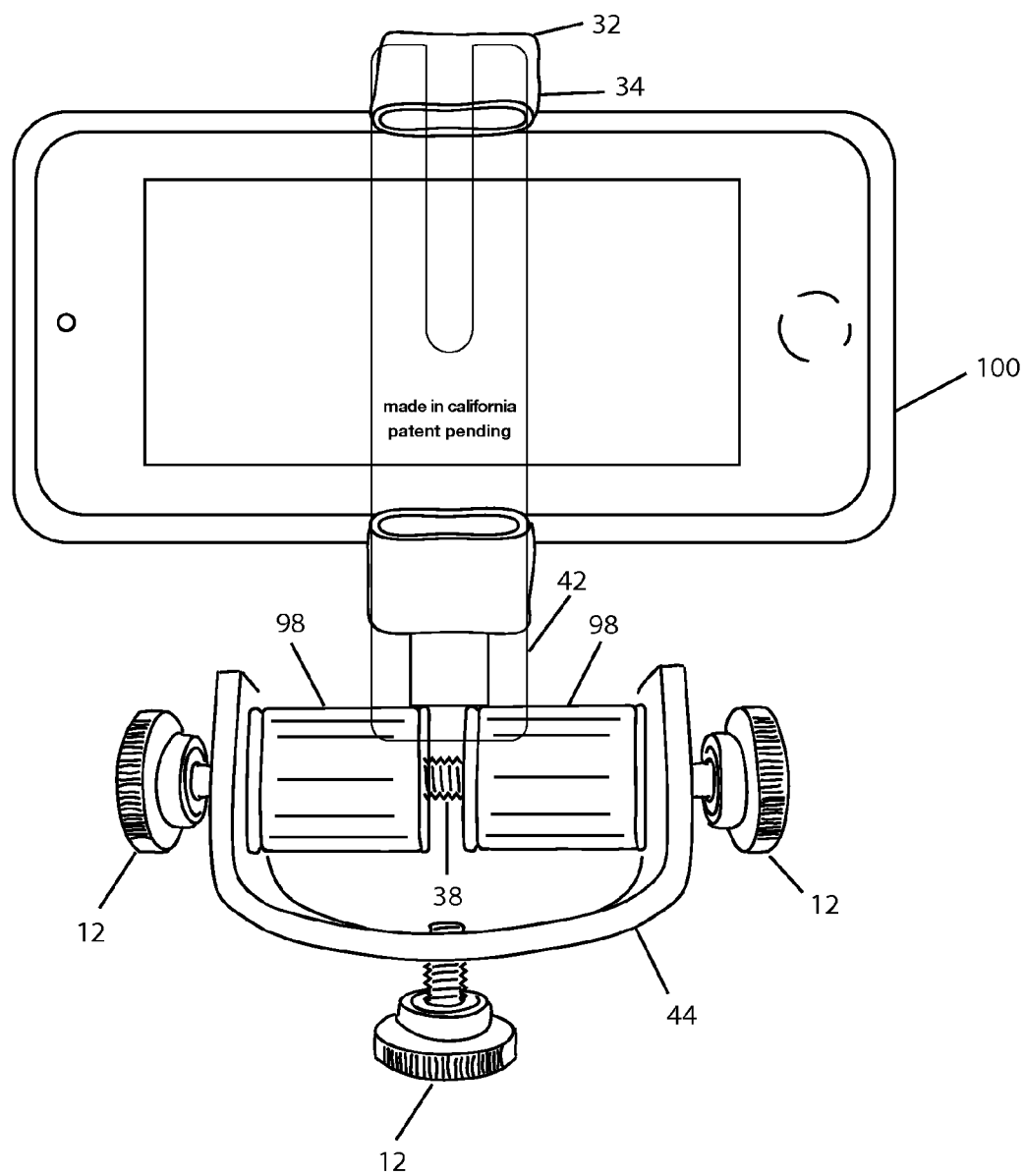
FIG. 9 is a front perspective view of the invention in FIG. 7 shown mounted to an articulating base.

FIG. 8 shows the item in FIG. 7. fully assembled with a threaded object 98 screwed on to the set screw 38 which protrudes through the threaded hole 36 through to exterior side of the arc 30. The fully assembled retention and handle device is being used as a stand in the horizontal position and is resting on a flat surface 200. FIG. 8 also shows the threaded and slotted components 98 connected with a set screw 38 of a length in the 0.749" to 1.51" range adjusted to allow the snug fit of the slotted bar 42 to slide into the two slots as seen in FIG. 9. FIG. 9 shows additional components a base 44 for the dual set screw mounted threaded components 98 which are secured to the base with thumb screws 12.

Figure 10:
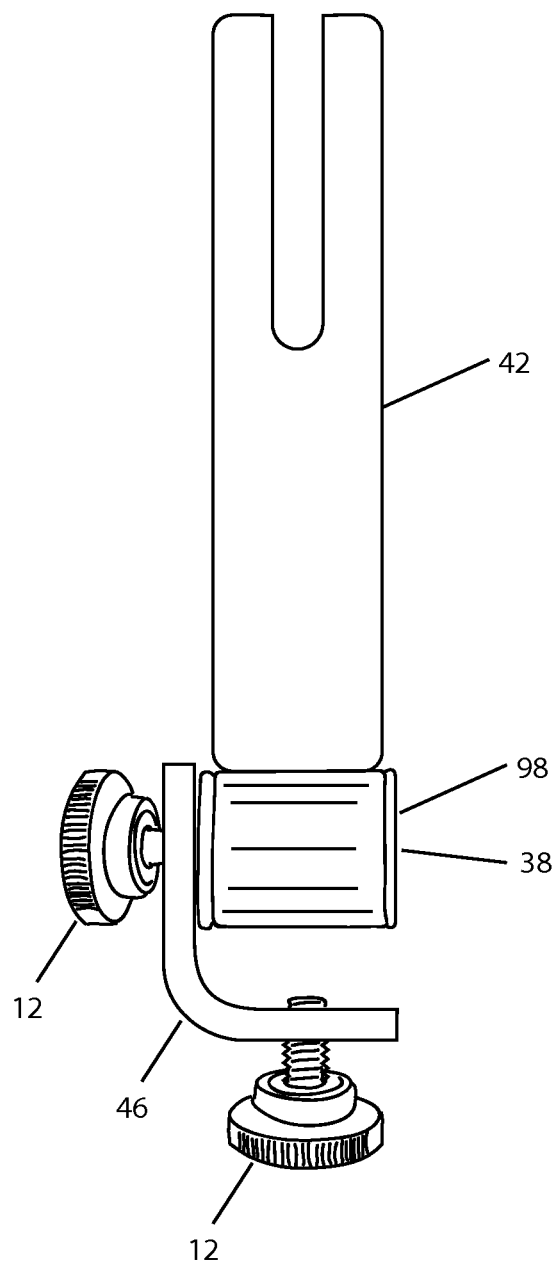
FIG. 10 is a front perspective view of the alternative embodiment of a slotted bar and articulating base element of the invention.

FIG. 10 shows an alternative embodiment of the use of the threaded component 98 as a hinge in combination with an alternative L-shaped base 46 with a threaded base and containing a thumb screw but the threaded base could just as easily be open for some other attachment means. In this instance the slotted bar 42 from FIG. 8 has been cut to fit into the slot area of a threaded component 98. The cut and the fit may be seen in FIG. 12 and FIG. 12 reveals a set screw 38 which holds the slotted bar 42 firmly in place in the threaded component 98.

Figure 11:
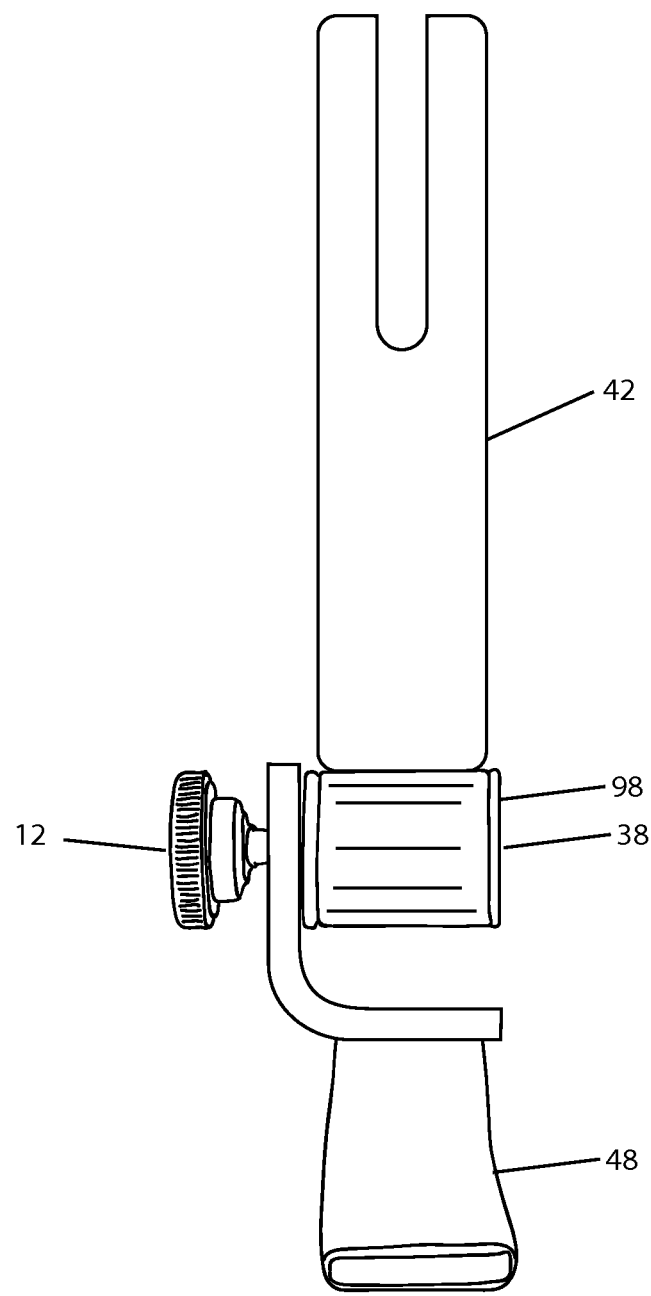
FIG. 11 is a front perspective view of the alternative embodiment of the invention with a slotted bar and articulating base element with a slide on clip.
Figure 12:
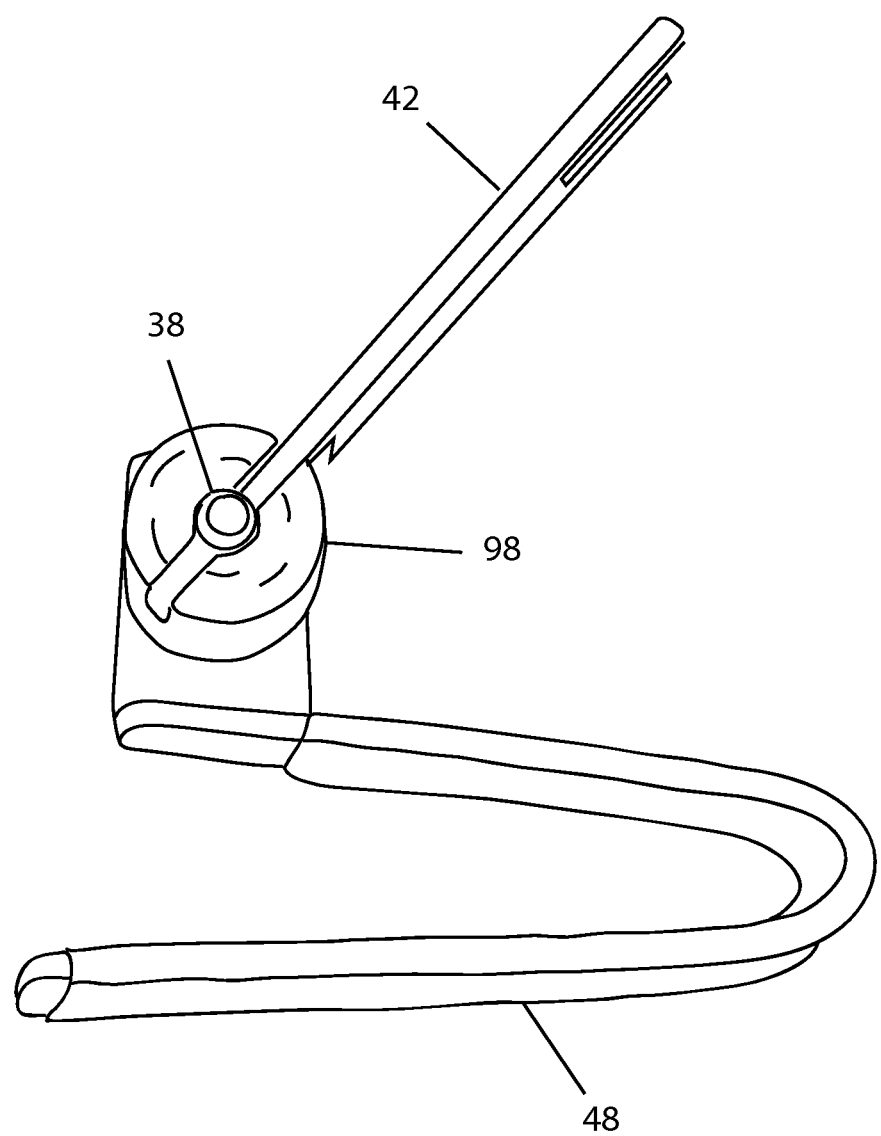
FIG. 12 is a side perspective view of the invention in FIG. 11.

FIG. 11 shows an alternative embodiment of the use of the threaded cylindrical component 98 as a hinge in combination with an alternative L-shaped base 46 which has a clip feature 48 which is seen more clearly in the side view FIG. 12. The L-shaped base with clip 48 may be made from a sufficiently rigid material so it does not break when pressure is applied to the slotted bar 42 to rotate the hinge feature of the threaded component 98. The clip element is designed to slide on to objects for instant mounting of the retention and handle device.

Figure 13:
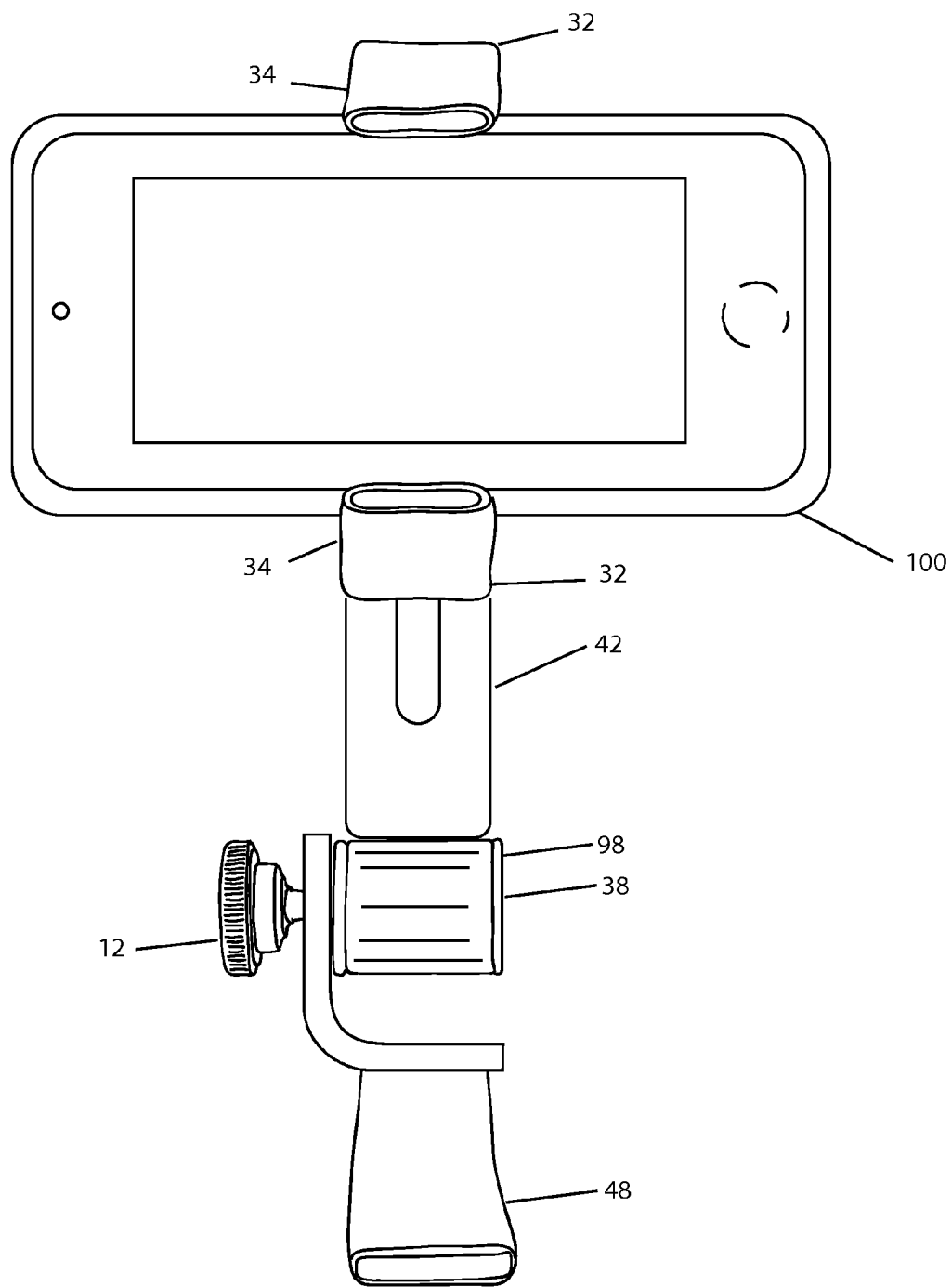
FIG. 13 is a front perspective view of the invention in FIG. 11 shown with a device mounted in the invention shown in FIG. 7.
Figure 14:
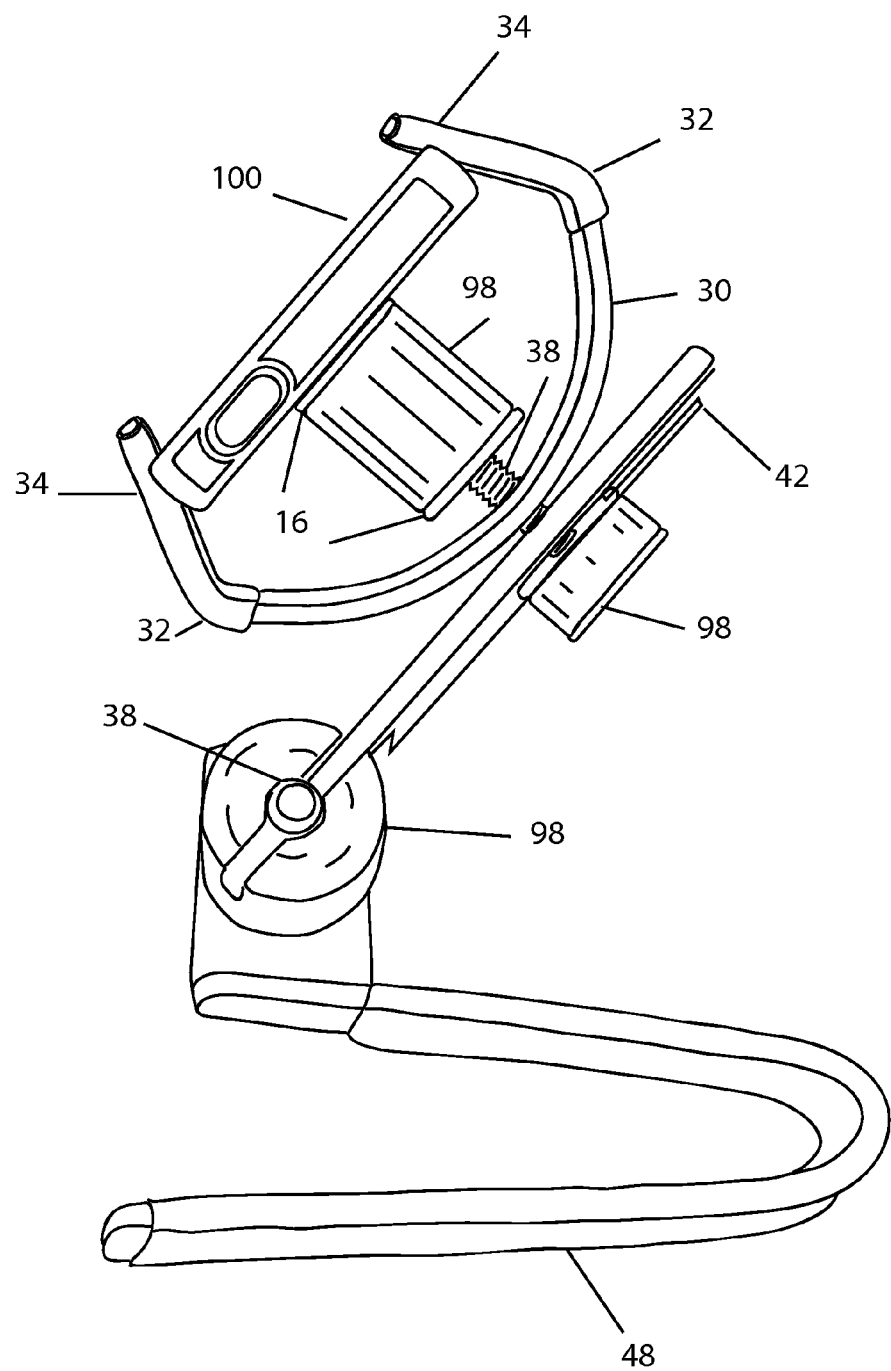
FIG. 14 is a side perspective view of the invention in FIG. 11 shown with a device mounted in the invention shown in FIG. 7.

FIG. 13 shows the embodiment of the retention and handle device in FIG. 12 with a media device mounted to the arc assembly demonstrated in FIG. 7. FIG. 14 shows the side view of FIG. 13 and demonstrates how the a threaded component 98 seen in FIG. 8. holds the arc of FIG. 7 on the slotted bar 42 illustrated in FIG. 8. Note the slotted bar 42 may be rotated to and fro via the hinge created by a thumb screw 14 and threaded component 98.

Figure 15:
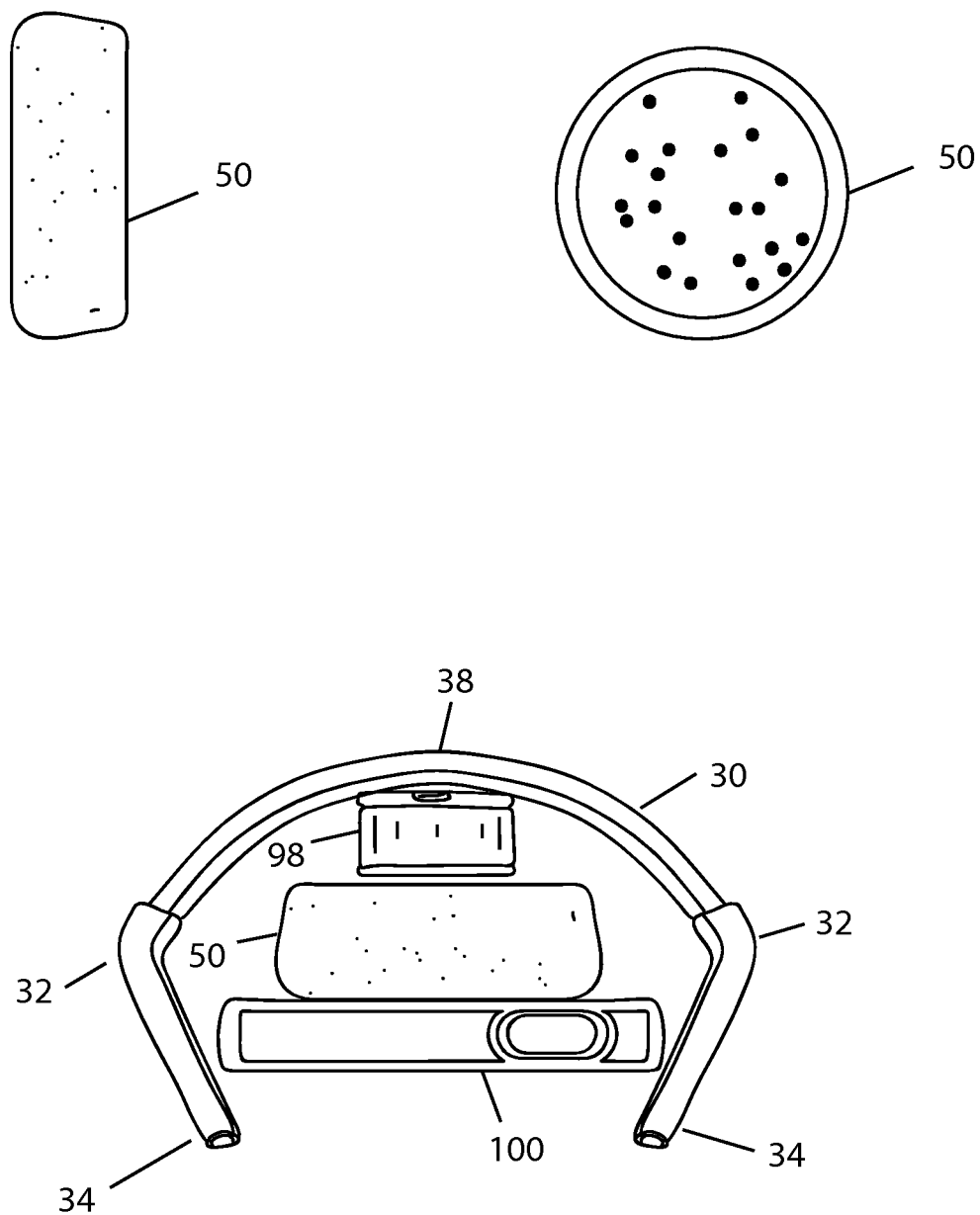
FIG. 15 is a top and side view of the invention in FIG. 7 which includes a larger pad and may be used to better protect and secure a device.

FIG. 15 shows a closed cell or rubber material wedge 50 which may be used as a wedge in conjunction with a threaded component 98. The wedge 50 may also be used by itself without a threaded component 98 and will secure a device if it is the proper thickness to fill the gap between the arc 30 and the media device 100.

Figure 16:
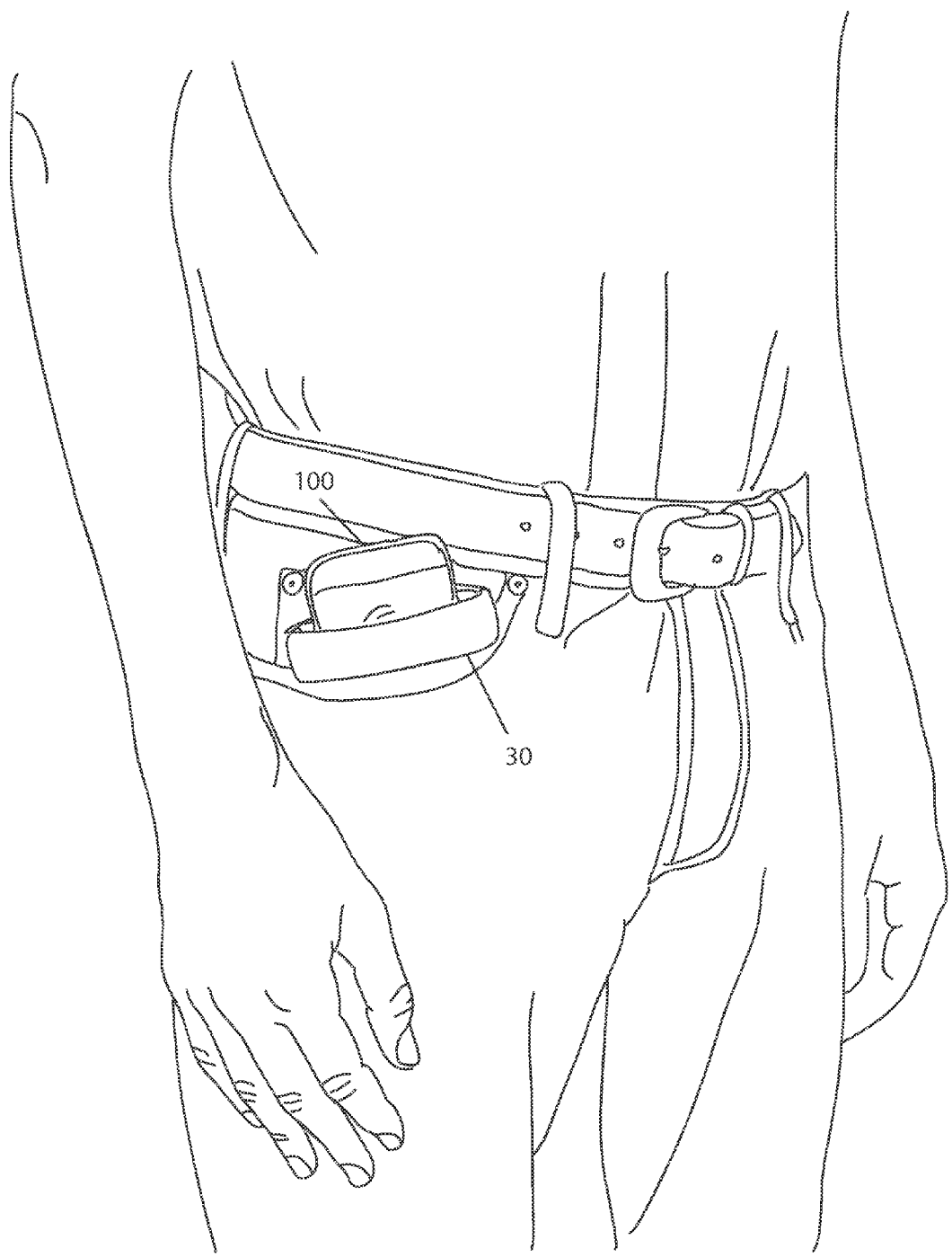
FIG. 16 is a perspective view of the invention in FIG. 7 to show how it fits in a pocket and acts as a handle for quick access.

FIG. 16 is a perspective view of the invention in FIG. 7 to show how it fits in a pocket and acts as a handle for quick access and prevents media devices from sliding down into pockets thereby converting any pocket or waist area of clothing into holster for relatively flat devices.

Figure 17:
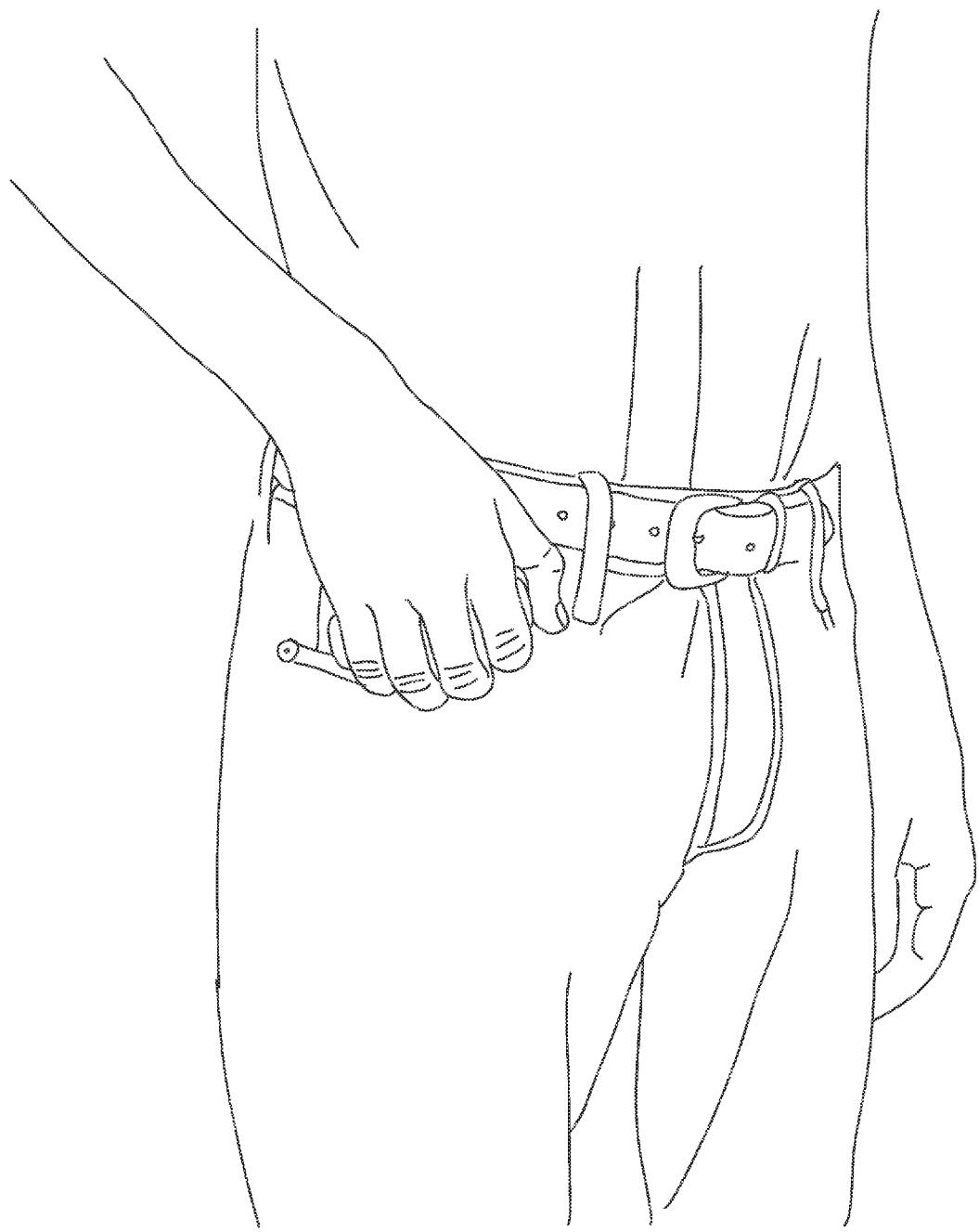
FIG. 17 is a perspective view of the invention in FIG. 7 to show how a person would use his or her hand to grab the invention if the invention was in a person's front pocket.

FIG. 17 is a perspective view of the invention in FIG. 7 to show how a person would use his or her hand to grab the invention if the invention was in a person's front pocket.

Figure 18:
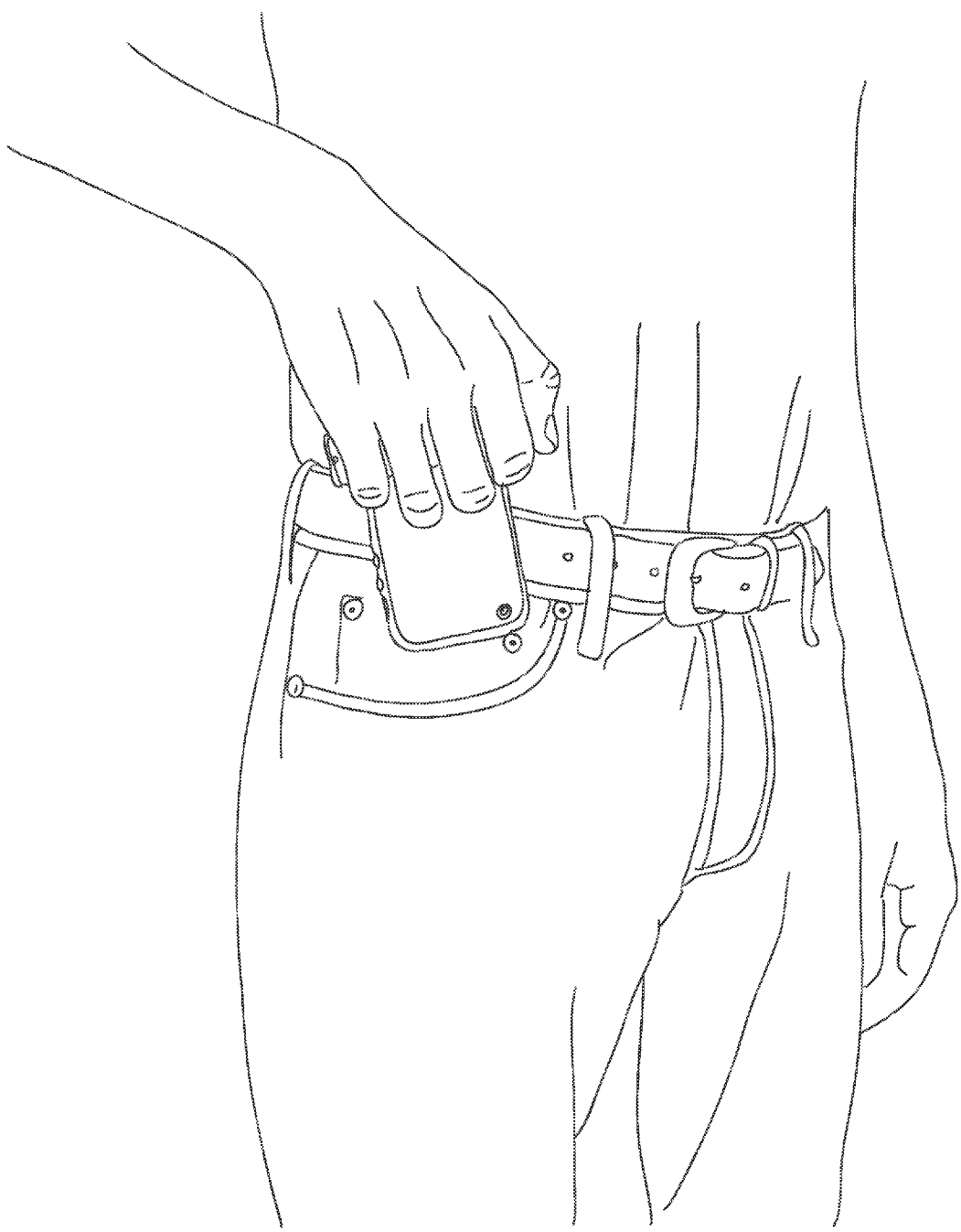
FIG. 18 is a perspective view of the invention in FIG. 7 to show how a person would use his or her hand to grab the invention if the invention was in a person's front pocket and remove it.

FIG. 18 is a perspective view of the invention in FIG. 7 to show how a person would use his or her hand to grab the invention if the invention was in a person's front pocket and remove it.

Figure 19:
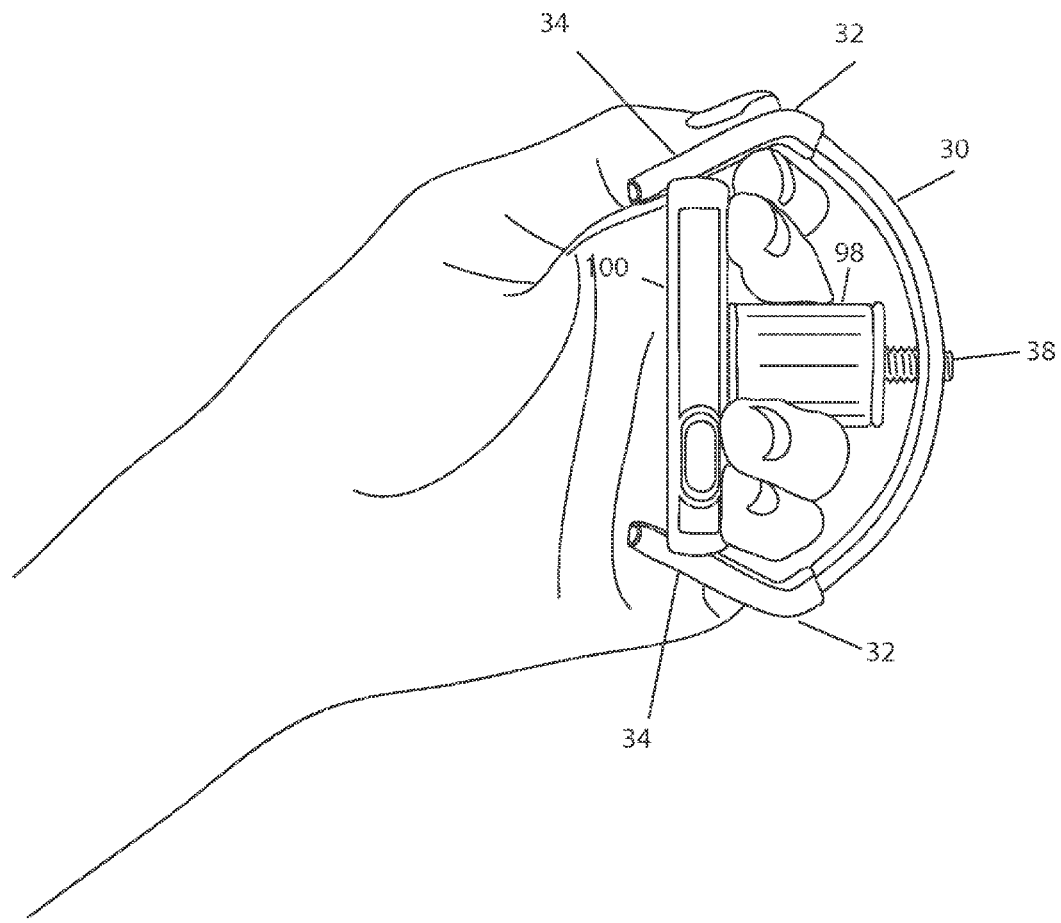
FIG. 19 is a perspective view of the invention in FIG. 7 to show how a person would use his or her hand to grab the invention and use it as a handle with a device mounted.

FIG. 19 is a perspective view of the invention in FIG. 7 to show how a person would use his or her hand to grab the invention and use it as a handle with a device mounted.

Figure 20:
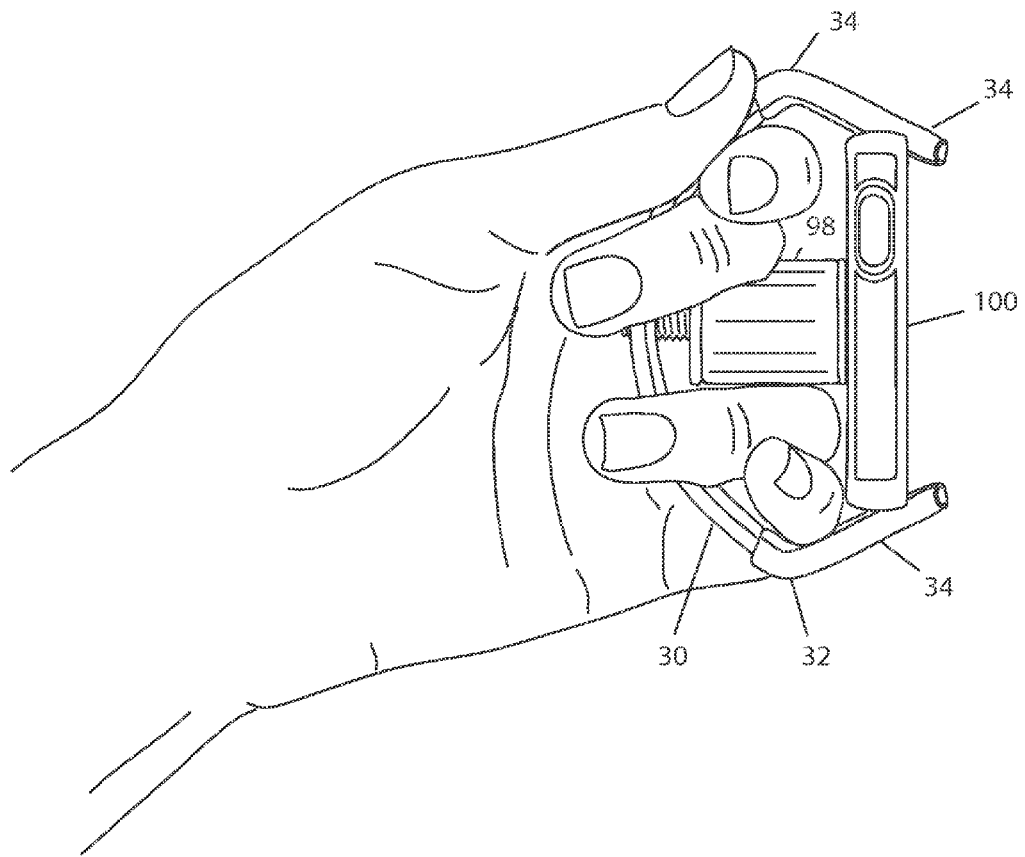
FIG. 20 is a perspective view of the invention in FIG. 7 to show how another method a person would use his or her hand to grab the invention and use it as a handle with a device mounted.

FIG. 20 is a perspective view of the invention in FIG. 7 to show how another method a person would use his or her hand to grab the invention and use it as a handle with a device mounted.

Figure 21:
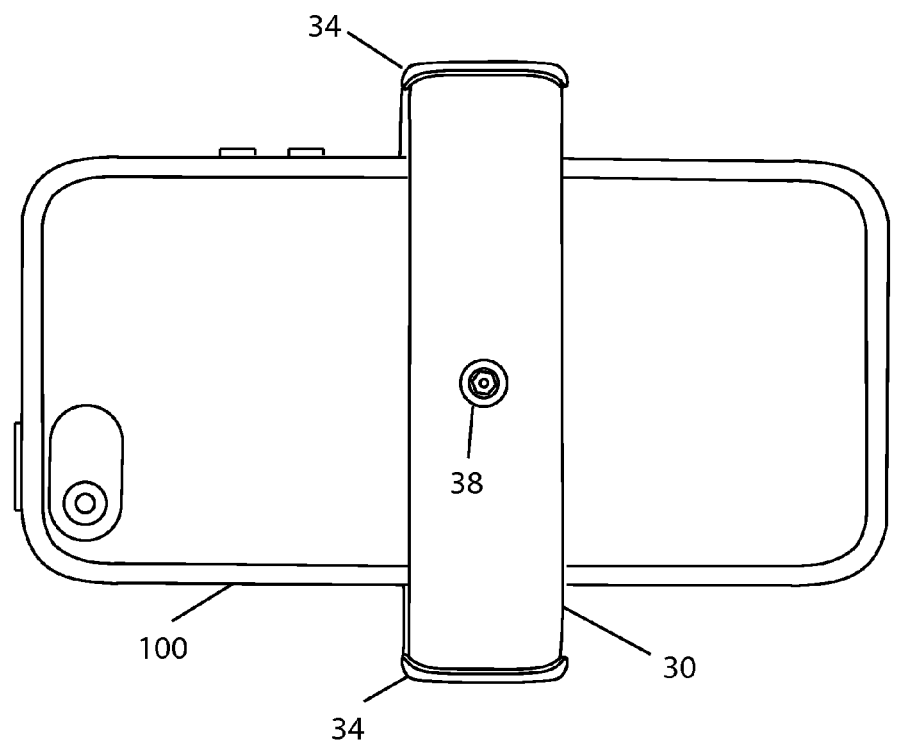
FIG. 21 is a rear view of the invention in FIG. 7 which shows the invention may be placed along different parts of a media capture and/or display device.
Figure 21:
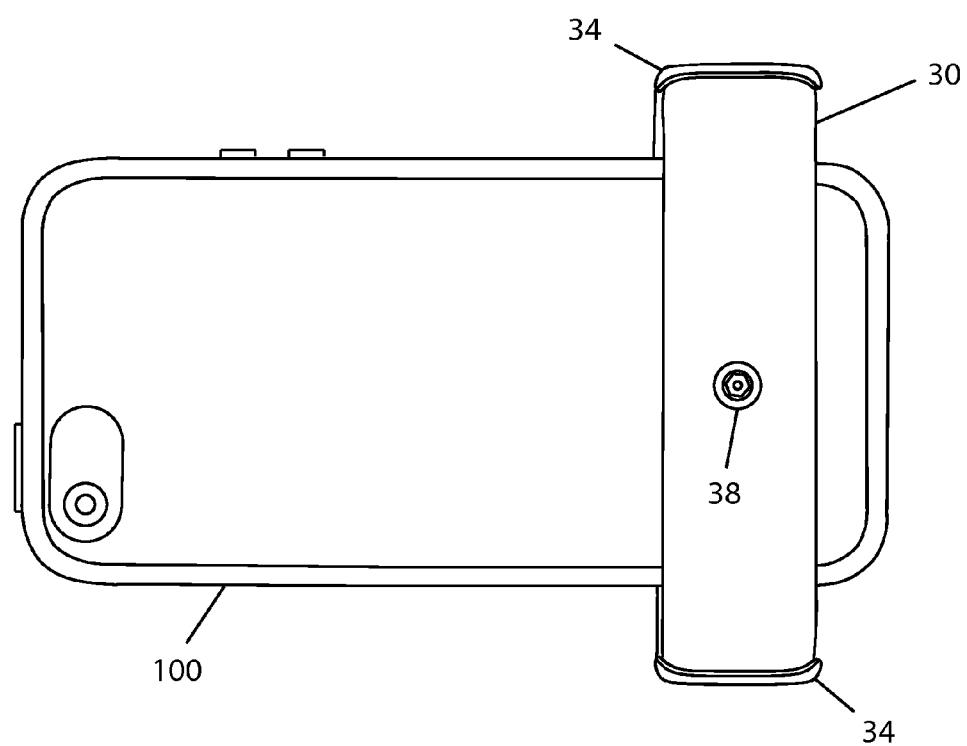
Figure 22:
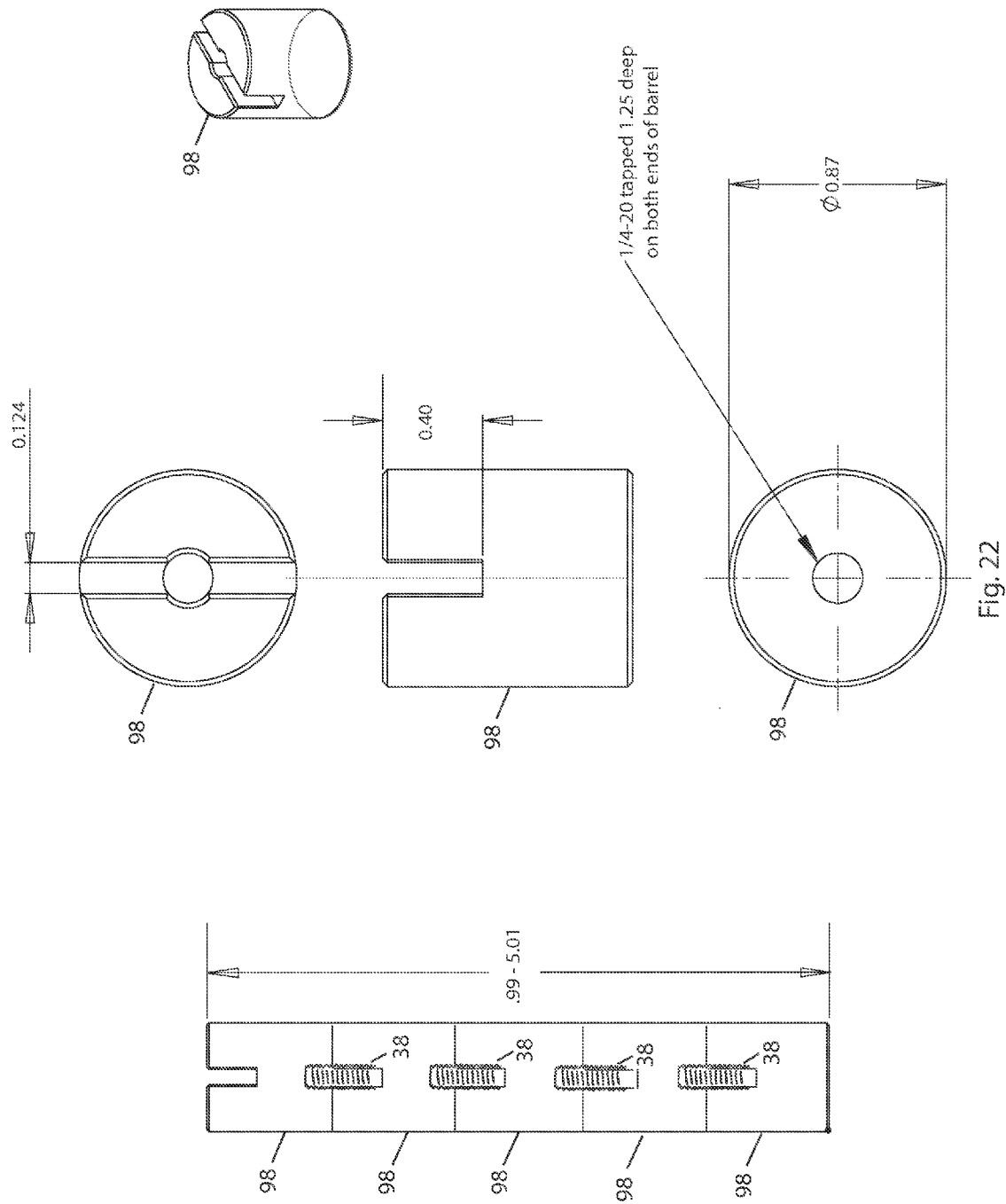
FIG. 22 is a top, side and perspective view of component of the invention which may be used to make custom-sized handles, act as a bolt, and provide a hinge to enable rotation of a mounted device.
Figure 23:
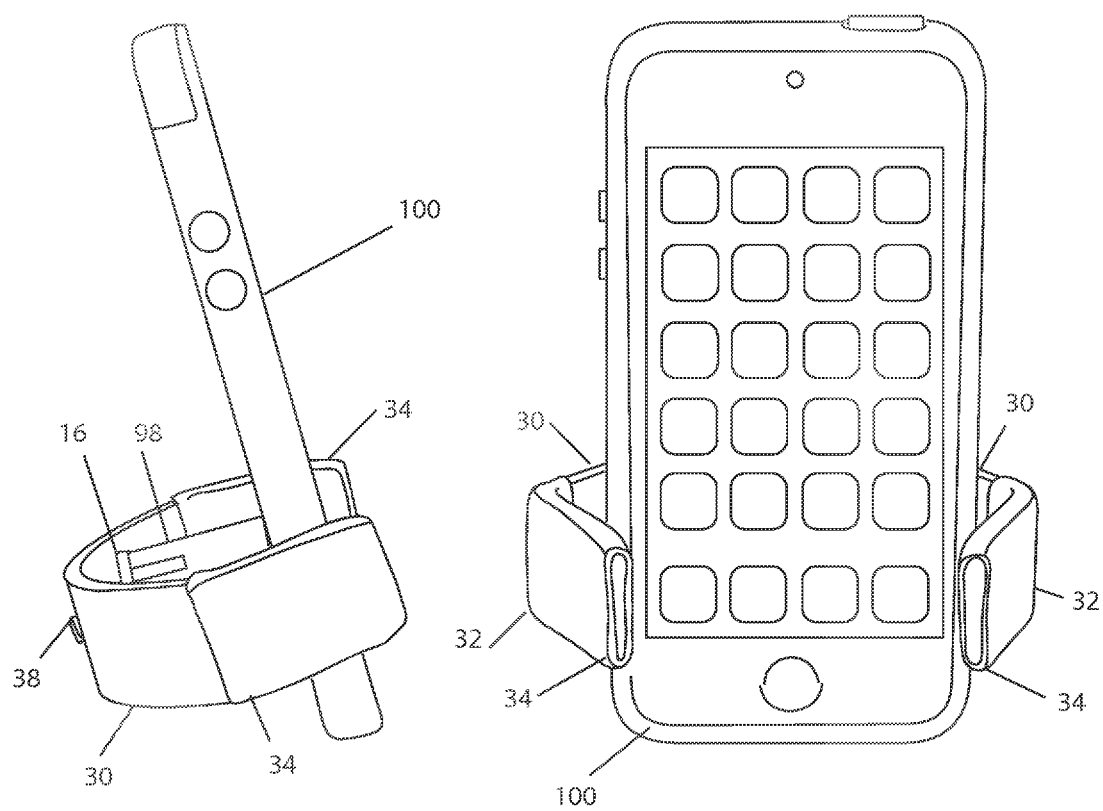
FIG. 23 is a front and side perspective view of the invention in FIG. 7 which shows the invention being used a stand with the media device in a vertical orientation.

FIG. 21 is a rear view of the invention in FIG. 7 which shows the invention may be placed along different parts of media device;

FIG. 22 is a top, side and perspective view of a threaded and optionally slotted component of the invention which may be used to make custom-sized handles to fit different size hands and varying in size range from 0.49 inches to 5.01 inches, act as a bolt, and provide a hinge to enable rotation of a mounted device;

FIG. 23 is a front and side perspective view of the invention in FIG. 7 which shows the invention being used a stand with the media device in a vertical orientation;

FIG. 24 is a side perspective view of the invention in FIG. 7 which shows the invention being used mounted in a car in a horizontal position;

The advantages of the present invention include, without limitation, that it is portable, pocket and purse friendly, quick and easy to mount a media device and enables quick and super secure retention and is easier to grab and hold. It is easy to for these devices to flow along with a person as the media device performs different functions for its user according to what the user is doing. While sleeping, it may turn a media device into an alarm clock, While eating breakfast, the device may used as vertical stand to read on online article. While driving the device may be used to mount the media device in a car. The retention and handle system allow for quick mounts via the clip and L-bar portions. Most importantly, the invention consists of re-arrangeable components which may be assembled in a myriad of ways with the only limit being the imagination of the user.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A retention system for holding a flat screen device having front and back sides the front side having a screen for viewing, the retention system comprising:

a resilient arc made of a unitary one-piece structure and having a concave inner surface, a convex outer surface and opposing ends extending inwardly, forming an arc opening;
an adjustable post extending from the inner surface of the arc toward the opening;
a pressure plate mounted to the adjustable post;
a pad attached with the pressure plate;
wherein a width of the arc opening is adjusted by bending the arc to create a width of the arc opening such that a flat screen device may be inserted at an angle within the arc opening then turned upright such that it is positioned flat against the pressure plate such that the pressure plate pad is configured to push against the back side of a flat screen device which is inserted into the arc so that the flat screen device is retained within the opening by contact between the pressure plate pad and the inwardly extending opposing ends of the arc by three points of pressure, at least one point of pressure supporting a front side perimeter edge of the flat screen device against the inner surfaces of the inwardly extending opposing ends of the arc without allowing the front side of the flat screen device to extend beyond the arc opening and without obscuring a user's view of the front side screen of the flat screen device.

2. The retention system of claim 1 wherein the arc including a first width and second width being less than the first width and a center point directly opposite the opening,
the first width of the semi-rigid arc provided at areas adjacent above and adjacent below the center point,
the second width of the semi-rigid arc providing less rigidity allowing the arc opening to be easily adjusted to the width of the flat screen device such that the flat screen device is held between the inside surface of the arc's opposing ends,
wherein once the arc opening is adjusted, the flat screen device may be inserted, retained and removed within the arc opening without readjusting the width of the arc opening.

3. The retention system of claim 1 wherein the arc's opposing ends each have tabs.

4. The retention system of claim 3 wherein the tabs covering the opposing arc ends are made of flexible material serving to maintain the edges of a flat screen mobile device within the opening without damaging the edges of the flat screen mobile device or obscuring the view of the screen of the flat screen mobile device screen.

5. The retention system of claim 3 wherein the tabs are of a greater width than the arc opposing ends.

6. The retention system of claim 1 wherein the arc's opposing ends are bent inward toward the concave surface of the arc defining an opening width less than the flat screen device width to prevent the flat screen device from being dislodged from the opening when secured against the inside surfaces of the opposing ends and the pressure plate.

7. The retention system of claim 1 wherein the post extends from a center point inside surface of the arc.

8. The retention system of claim 1 wherein the post is threaded and extends through a threaded hole located at a center point of the arc directly opposite the opening defined by the opposing ends.

9. The retention system of claim 8 wherein the post extends through the threaded hole located at the center point of the arc and a threaded barrel is mounted with that portion of the post extending from the center hole away from the convex surface of the arc.

10. The retention system of claim 9 wherein the threaded barrel attached with the post provides for rotation of the threaded post through the threaded hole at the center point of the arc allow the pressure plate to move toward and away from the opening as need to retain and release the screen device.

11. The retention system of claim 9 wherein that portion of the threaded post between the convex outside surface of the arc and the threaded barrel is configured to allow mounting of the retention system on to a mounting fork.

12. The retention system of claim 11 wherein the mounting fork is attached with a mountable base.

13. The retention system of claim 12 wherein the mountable base is configured to be removeably mounted to the inside of a car windshield.

14. The retention system of claim 12 where the mountable base is configured to attach with an end of a rod.

15. The retention system of claim 8 wherein the pressure plate is a threaded barrel mounted with the threaded post.

16. The retention system of claim 15 wherein the outside surface of that portion of the pressure plate configured to retain the screen based device against the inner surface of the opposing ends is made of a material which provides enough flexibility as not to damage the screen device when the screen based device when retained against the inside surface of the opposing ends.

17. The retention system of claim 1 wherein the post forms the pressure plate.

18. The retention system of claim 1 wherein the pressure plate is adjustable towards the arc opening defined by the opposing ends such that the pressure plate is configured to apply appropriate pressure to the back side of the flat screen device to retain the flat screen device against the inside surface of the opposing ends at the arc opening.

19. The retention system of claim 1 configured to allow a flat screen mobile device to be placed within the concave opening of the arc and retained between the opposing ends and the pressure plate.

20. The retention system of claim 1 where the space defined by the concave surface of the arc is configured to allow a person to easily hold the retention system in hand to place or remove the retention system from a mountable base.

* * * * *